Aug. 29, 1933.   T. McL. JASPER   1,924,121

WELDED MANWAY FOR PRESSURE VESSELS

Filed Aug. 18, 1930

INVENTOR.

T. McLean Jasper

BY

ATTORNEY.

Patented Aug. 29, 1933

1,924,121

UNITED STATES PATENT OFFICE 1,924,121

WELDED MANWAY FOR PRESSURE VESSELS

Thomas McLean Jasper, Milwaukee, Wis., assignor to A. O. Smith Corporation, Milwaukee, Wis., a Corporation of New York Application August 18, 1930. Serial No. 476,033

4 Claims. (Cl. 285—106)

The present invention relates to welded manways for pressure vessels and more particularly to a method of reenforcing the same.

An object of the invention is to provide a method of reenforcing manways for pressure vessels in which injurious stresses about the manway are more readily eliminated.

Various other objects will be apparent from the following description and claims.

The invention will be best understood by referring to the accompanying drawing in which.

Figure 1:
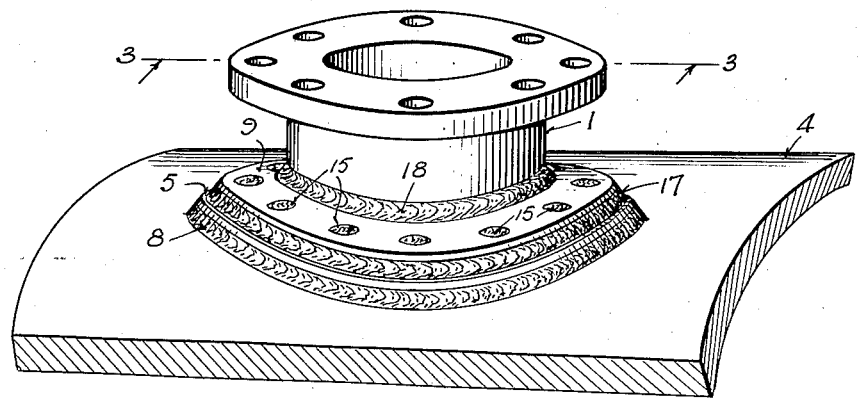
Figure 1 is a perspective view of a manway welded to a vessel wall in accordance with the preferred embodiment of the present invention.
Figure 2:
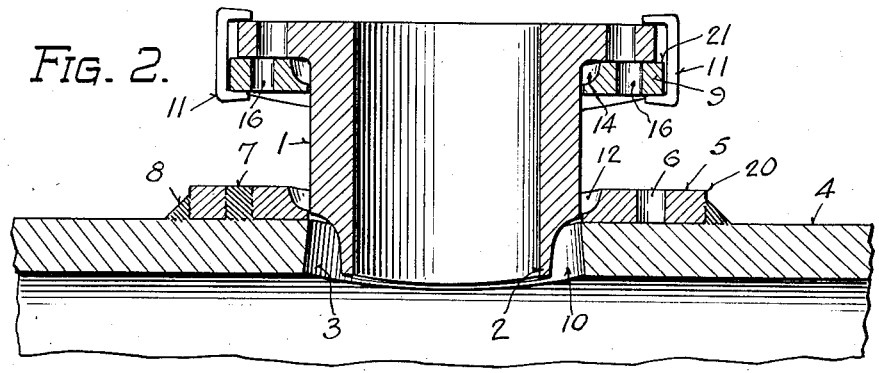
Fig. 2 is a longitudinal sectional view of a partially assembled manway.
Figure 3:
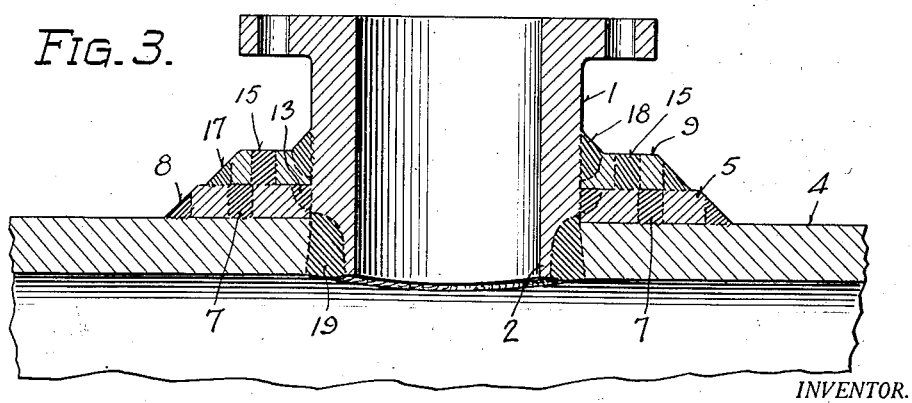
Fig. 3 is a longitudinal sectional view of the manway and vessel taken on the line 3—3 of Fig. 1.

The present invention is particularly applicable to vessels which are fabricated entirely by welding, though the method of reenforcement set forth herein is applicable to vessels otherwise fabricated.

In fabricating a vessel by welding, flat metal plates of substantial thickness are rolled into cylindrical form and welded into a unitary structure preferably by means of an electric arc.

Where manways are desired, openings are cut in the vessel wall and the manways are electric arc welded to the vessel.

The fabrication of vessels by welding utilizes the intense heat of the arc to bring the plates to be joined to a welding temperature. The heat of the arc causes the metal adjacent the weld to expand during welding and to thereafter contract. In some instances the stresses are great enough to cause the metal wall of the vessel to crack. By depositing relatively small amounts of weld metal in one place, and by distributing said metal over a larger area, the concentration of the heat of the arc upon a localized part of the vessel is avoided, and harmful residual stresses are eliminated.

In carrying out the invention, a tubular manway 1 is provided, the lower end of which is chamfered to taper inwardly to form a thin lip 2. A suitable opening 3 is cut in the vessel wall 4 to receive the lip 2 of the manway 1.

A reenforcing plate 5 is placed about the opening 3 against the outer surface of the wall 4 of the vessel. The plate 5 is provided with a plurality of openings 6 for receiving weld metal 7. The weld metal is preferably deposited by means of an electric arc established between the metal about the opening and a fusible metallic electrode. An arc is established in a similar manner about the outer periphery of the reenforcing plate 5, and weld metal 8 is deposited uniting said reenforcing plate to the vessel wall.

A second reenforcing plate 9 is slipped over the end of the manway 1 and said manway is inserted into the opening 3 which is large enough so that an annular welding groove 10 is provided between the vessel wall 4 and the lip 2. The reenforcing plate 9 is temporarily clamped at the top of the manway by suitable clamps 11.

The inner periphery of the reenforcing plate 5 is chamfered to provide a welding groove 12 between said reenforcing plate and the manway 1. The weld metal 13 is deposited in the groove in the same manner as before, joining the manway 1 to said reenforcing plate 5.

The clamps 11 are thereafter released and the reenforcing plate 9, which is preferably smaller in diameter than the first plate 5, is superimposed upon said plate 5. The inner periphery of the plate 9 is chamfered forming a welding groove 14 between it and the manway 1. Weld metal 15 is deposited through suitable openings 16 in the plate 9 and weld metal 17 is deposited about the outer periphery of said plate to securely fasten it to the plate 5 thereunder. Weld metal 18 is deposited in the groove 14 to secure the plate 9 to the manway 1.

The welding groove 10 between the vessel wall 4 and the lip 2 is then filled with weld metal 19 completing the installation of the manway.

The annular welds about the reenforcing plates are preferably about 55 to 60% of the thickness of each of said plates.

The number of reenforcing plates used in carrying out the present invention is dependent upon the amount of reenforcement necessary. Two of such plates often suffice, though more may be used without departing from the spirit and scope of the appended claims. The projecting corners 20 and 21 of the reenforcing plates 5 and 9 respectively add little to the strength of the vessel and may be removed to produce a neat appearance.

The method employed in the present invention of reenforcing manways distributes the weld metal over a larger area than methods hitherto employed and avoids the application of heat in a manner which will produce harmful stresses.

It will be understood that various embodiments may be used within the scope of the accompanying claims.

I claim:

1. In a pressure vessel having a manway neck, in combination, a manway disposed in the manway opening, the lower end of the manway being chamfered circumferentially to provide a welding groove between the wall defining the manway opening and the manway, a plurality of reenforcing plates having openings therethrough for receiving the manway, and holes for receiving plug welds, said reenforcing plates being superimposed on the vessel and one another, the superimposed plates being chamfered to form welding grooves with the manway, and weld metal deposited in the welding grooves and holes for securely attaching the manway to the vessel.

2. In a pressure vessel having a manway neck, in combination, a manway disposed in the manway opening, the lower end of the manway being chamfered circumferentially to provide a welding groove between the wall defining the manway opening and the manway, a plurality of reenforcing plates having openings therethrough for receiving the manway, and holes for receiving plug welds, said reenforcing plates being superimposed on the vessel and one another, the superimposed plates being chamfered to form welding grooves with the manway, and weld metal deposited in the welding grooves and holes for securely attaching the manway to the vessel, the holes in the superimposed plates being staggered.

3. In a pressure vessel having a manway opening, in combination, a manway having a thin flexible lip at the end disposed within the opening, a reenforcing base plate disposed coaxially with respect to the manway and having an opening of approximately the size of the manway and a lip defining the edge of the opening in the reenforcing plate, a supplementary reenforcing plate smaller than the base plate but similarly shaped and superposed upon the base plate, welding metal deposited between the thin lip of the manway and the vessel wall to weld the manway to the wall between the reenforcing base plate and the manway and about the outer periphery of said plate between the supplementary reenforcing plate and the manway and about the outer periphery of the plate to weld it to the plate beneath, and through openings in each of the reenforcing plates to join the plates to the metal beneath, all of said metal being so deposited to minimize and distribute residual welding stresses.

4. In a pressure vessel, in combination, a tubular connection disposed in an opening in the vessel wall and providing a welding groove between its outer periphery and the inner edge of the wall at the opening, a plurality of reenforcing plates having openings therethrough receiving the tubular connection and holes for receiving plug welds, said reenforcing plates being superimposed on the vessel wall and one another about the tubular connection, the superimposed plates being chamfered to form welding grooves with the tubular connection, weld metal deposited in the welding grooves and holes and integrally uniting the tubular connection, reenforcing plate, and vessel wall into a unitary structure, and weld metal joining each plate at its outer periphery to the metal beneath.

T. McLEAN JASPER.